United States Patent
Gotou

(10) Patent No.: US 6,505,962 B2
(45) Date of Patent: Jan. 14, 2003

(54) VEHICLE LAMP

(75) Inventor: Yoshimasa Gotou, Shizuoka (JP)

(73) Assignee: Koito Manufacturing Co., Ltd., Tokyo (JP)

(*) Notice: Subject to any disclaimer, the term of this patent is extended or adjusted under 35 U.S.C. 154(b) by 5 days.

(21) Appl. No.: 09/770,284

(22) Filed: Jan. 29, 2001

(65) Prior Publication Data

US 2001/0010635 A1 Aug. 2, 2001

(30) Foreign Application Priority Data

Jan. 27, 2000 (JP) .......................................... 2000-018801
Oct. 10, 2000 (JP) ......................................... 2000-308633

(51) Int. Cl.[7] .............................................. F21V 13/00
(52) U.S. Cl. ........................ 362/517; 362/518; 362/544; 362/543; 362/545
(58) Field of Search ................................. 362/517, 518, 362/544, 297, 346, 543, 545, 247, 241

(56) References Cited

U.S. PATENT DOCUMENTS

| 5,172,972 | A | * | 12/1992 | Terao | 362/66 |
|---|---|---|---|---|---|
| 5,566,057 | A | | 10/1996 | Iwami | 362/61 |
| 5,692,824 | A | | 12/1997 | Ooishi | 362/80 |
| 6,024,474 | A | | 2/2000 | Tanaka | 362/544 |
| 6,095,672 | A | * | 8/2000 | Beningna et al. | 362/545 |
| 6,234,646 | B1 | * | 5/2001 | Ito | 362/235 |
| 6,270,241 | B1 | * | 8/2001 | Collot et al. | 362/544 |
| 6,402,356 | B2 | * | 6/2002 | Gotou | 362/543 |

* cited by examiner

Primary Examiner—Stephen Husar
Assistant Examiner—Anabel Ton
(74) Attorney, Agent, or Firm—Sughrue Mion, PLLC

(57) ABSTRACT

A vehicle lamp in which a lighting chamber is composed of a body and a lens covering an opening face of the body, the vehicle lamp includes: a first reflector, which is arranged in the lighting chamber, for reflecting the rays of a first electric bulb in substantially the front direction; a second electric bulb arranged at the rear of the first reflector so that the second electric bulb cannot be seen from the front direction; and a second reflector for reflecting the rays of the second electric bulb.

10 Claims, 4 Drawing Sheets

VEHICLE LAMP

BACKGROUND OF THE INVENTION

1. Field of the Invention

The present invention relates to a new vehicle lamp. More particularly, the present invention relates to a technique by which a lighting device shines with contrast so as to give an intense impression.

2. Description of the Related Art

In a conventional single lighting device such as a tail lamp, for example, there are provided a single light source and a single reflector corresponding to the light source.

In a conventional lamp tail lamp having a single function, for example, the single function is fulfilled by a single light source and a single reflector corresponding to the single light source. Therefore, the conventional tail lamp shines monotonously. Accordingly, it is impossible to give an intense impression on a person who sees the tail lamp.

SUMMARY OF THE INVENTION

It is an object of the present invention to give an intense impression on a person who sees the tail lamp by making the lamp shine with contrast.

In order to solve the above problems, the present invention provides a vehicle lamp including:

a lighting chamber composed of a body and a lens covering an opening face of the body, wherein the opening face of the body is directed substantially in a front direction of the lamp;

a first reflector, which is arranged in the lighting chamber, for reflecting the rays of a first light source in the front direction;

a second light source arranged at the rear of the first reflector so that the second light source can not be seen from the front direction; and a second reflector for reflecting the rays of the second light source, wherein the two reflectors are positioned so that they can separately reflect the rays of the first and the second light sources without dividing the lighting chamber.

Accordingly, when both the first and the second light source are turned on, concerning the rays of the first light source, both the direct rays of the first light source and the reflected rays of the first light source that are reflected by the reflector are irradiated to the front. On the other hand, concerning the rays of the second light source, only the reflected rays that are reflected by the second reflector are irradiated to the front. That is, the rays of the second light source are irradiated by indirect irradiation. Therefore, a contrast is caused between the rays of the first light source and the rays of the second light source.

BRIEF DESCRIPTION OF THE DRAWINGS

The above and other objects and advantages of the present invention will become more apparent by describing in detail preferred exemplary embodiments thereof with reference to the accompanying drawings, wherein like reference numerals designate like or corresponding parts throughout the several views, and wherein:

FIG. 1 is a view showing the first embodiment of the vehicle lamp of the present invention together with FIGS. 2 to 4, wherein FIG. 1 is a front view;

DETAILED DESCRIPTION OF THE PREFERRED EMBODIMENTS

Figure 1:
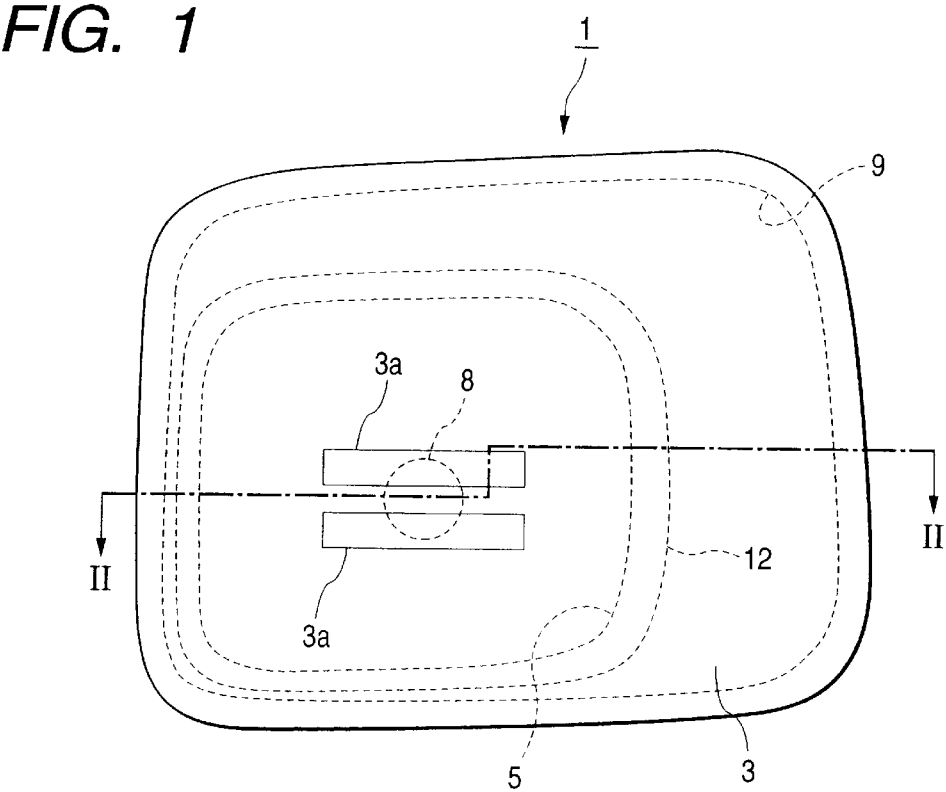
Figure 2:
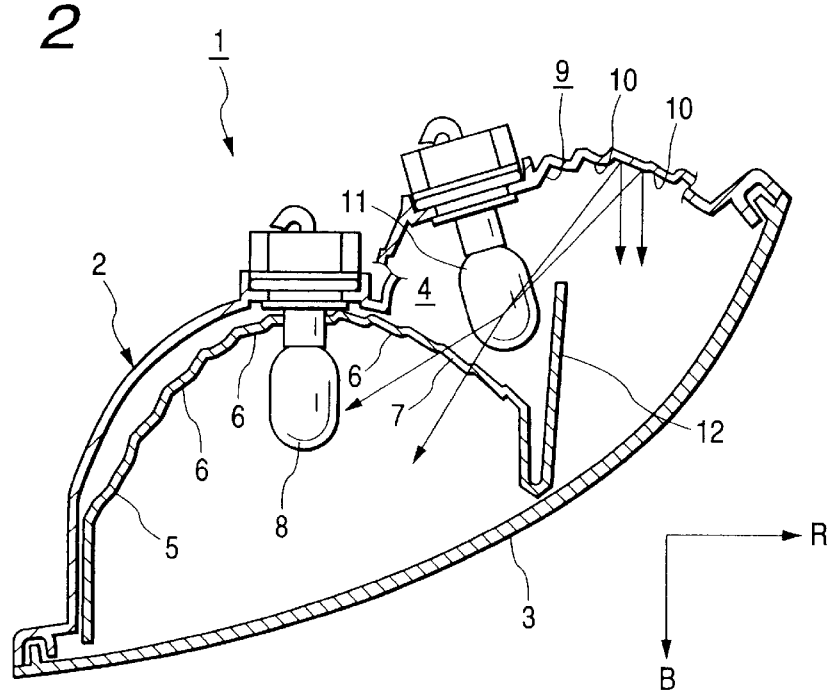
FIG. 2 is a cross-sectional view taken on line II—II in FIG. 1.
Figure 3:
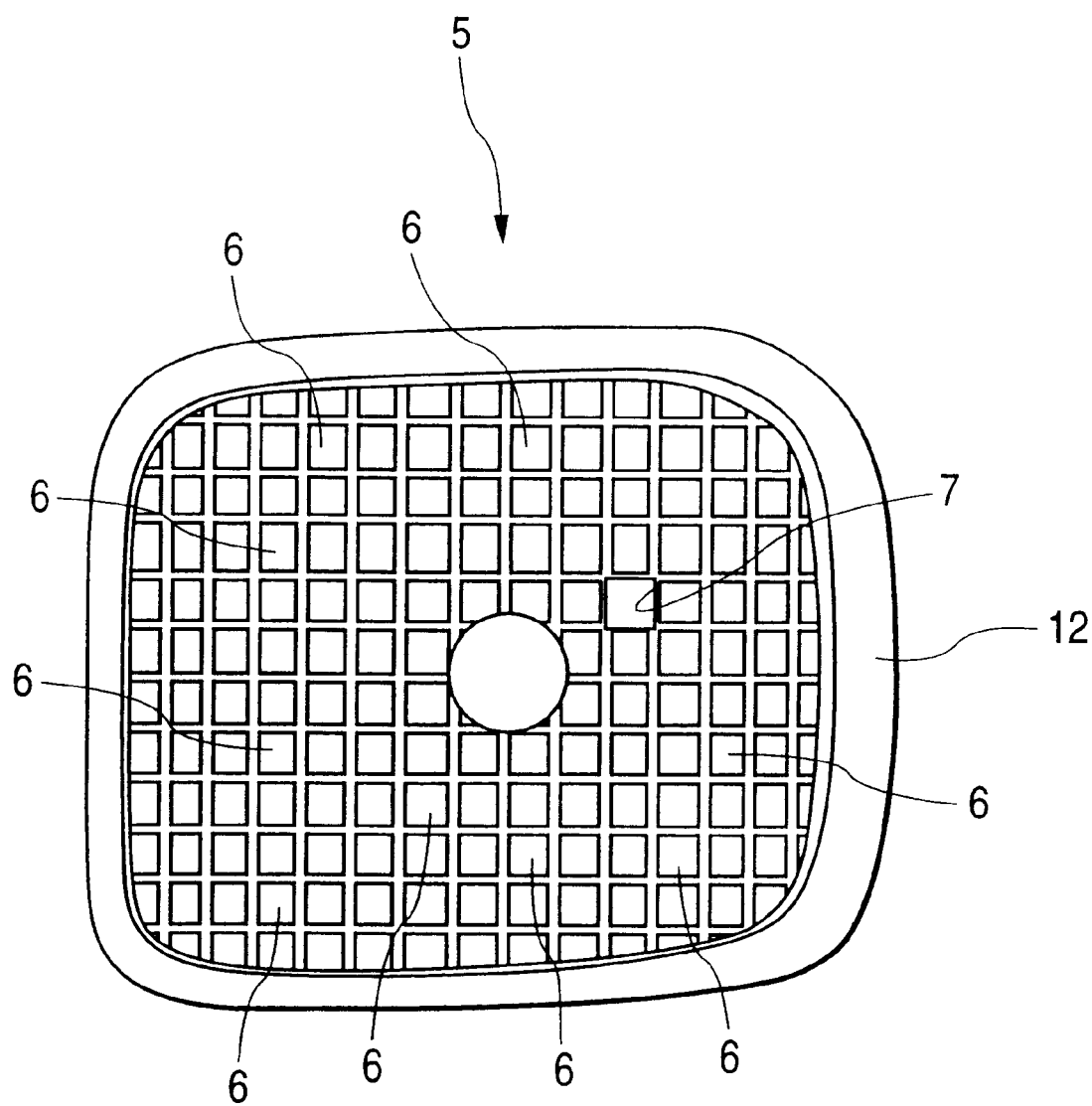
FIG. 3 is a front view showing the first reflector.
Figure 4:
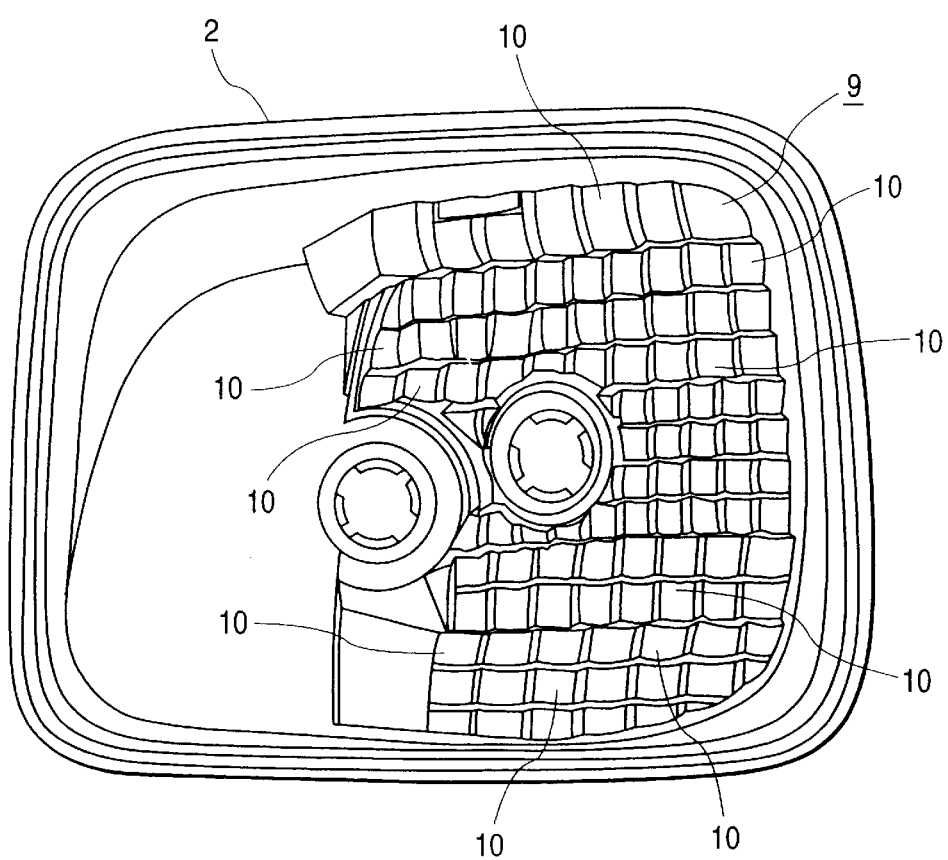
FIG. 4 is a front view showing the second reflector.

Referring to the appended drawings, an embodiment of the present invention will be explained in detail below. In the embodiment shown in the drawings, the present invention is applied to a lamp having a function of a tail and stop lamp.

FIGS. 1 to 4 are views showing a first embodiment of the vehicle lamp of the present invention.

The vehicle lamp 1 includes a body 2, the opening face of which is formed in the front and is continued to the side. This vehicle lamp 1 is incorporated into the right rear portion of an automobile. Accordingly, the front of the vehicle lamp 1 is directed to the rear of the automobile. That is, the front of the vehicle lamp 1 is directed in the direction of arrow B in FIG. 2. Additionally, the side of the vehicle lamp 1 is directed to the right, that is, the side of the vehicle lamp 1 is directed in the direction of arrow R in FIG. 2. The lens 3 is attached to the vehicle lamp in such a manner that the lens 3 covers the opening face. Therefore, the lighting chamber 4 is defined by the body 2 and the lens 3.

In the lighting chamber 4, there is provided a first reflector 5 that is located on the left. On a surface of the first reflector 5, there are provided a plurality of small reflecting elements 6, 6, . . . . These small reflecting elements 6, 6, . . . are arranged on an arbitrary curved face, or a free curved face. In other words, these small reflecting elements 6, 6, . . . are arranged on a substantial paraboloid. In this connection, in a portion corresponding to one of these small reflecting elements 6, 6, . . . , there is provided a light transmitting section 7. This light transmitting section 7 may be formed in such a manner that a portion of the first reflector 5 is cut out, that is, a light transmitting hole is formed. Alternatively, this light transmitting section 7 may be formed in such a manner that the first reflector 5 is made of transparent material, and a reflecting film is not formed in the portion corresponding to the light transmitting section 7.

At a predetermined position of the first reflector 5, that is, at a substantial focal point of the reflecting elements 6, 6, . . . , there is provided a first electric bulb 8 which is the first light source. The rays of the first electric bulb 8 that are reflected by the first reflector 5 are irradiated substantially to the front direction of the lamp. That is, the rays of the first electric bulb 8 that are reflected by the first reflector 5 are irradiated in the direction of arrow B in FIG. 2. This first electric bulb 8 functions as a tail and stop lamp. That is, at night, this first electric bulb 8 is turned on by a low output of electric power at all times. When the brakes are put on, this first electric bulb 8 is turned on by a higher electric power and, therefore, shines more brightly than the usual case in which the first electric bulb 8 is turned on by a low output of electric power. In a portion of the lens 3 corresponding to the front of the first electric bulb 8, and in a region 3a including the periphery of the portion of the lens 3 corresponding to the front of the first electric bulb 8, there is provided a step for hiding the first electric bulb 8 so that the first electric bulb 8 can not be seen from the front. That is, there is provided a so-called dummy step. Portions of the lens 3, except for the region 3a, are formed transparent in which no steps are formed.

The inside of the body 2 is coated with a reflecting film so that the inside of the body 2 is formed into a second reflector 9. The first reflector 5 is located in the front of, and on the left of, the second reflector 9. Therefore, when the second reflector 9 is seen from the front, a portion of the second reflector 9 is protruded to the right, upward, and downward, from the first reflector 5. Lengths of an upward protrusion and downward protrusion are maximum on the right, and decrease as the second reflector 9 extends to the left. On a surface of the second reflector 9, there is provided a plurality of small reflecting elements 10, 10, . . . . These small reflecting elements 10, 10, . . . are arranged on an arbitrary curved face, or a free curved face. In other words, these small reflecting elements 10, 10, . . . are arranged on a substantial paraboloid. In this connection, the shapes of these reflecting elements 10, 10, . . . are similar to the shapes of the reflecting elements 6, 6, . . . of the first reflector 5.

At the rear of the first reflector 5, at a predetermined positional relation with the second reflector 9, that is, at a substantial focal point of the reflecting elements 10, 10, . . . , there is provided a second electric bulb 11 which is the second light source. The rays of the second electric bulb 11 that are reflected by the second reflector 9 are irradiated substantially in the front direction of the lamp. That is, the rays of the second electric bulb 11 that are reflected by the second reflector 9 are irradiated in the direction of arrow B in FIG. 2. This second electric bulb 11 functions as a tail and stop lamp.

The extending section 12, which extends to the rear, is formed at an edge section on the right of the first reflector 5. Accordingly, the extending section 12 may be formed integrally or monolithically with the first reflector 5. Alternatively, the extending section 12 may be formed separately from the first reflector 5. However, when the extending section 12 is formed monolithically with the first reflector 5, the number of parts can be decreased.

The second electric bulb 11 is shaded by the first reflector 5, so that the second electric bulb 11 cannot be seen from the front direction. Further, when the extending section 12 is formed, the second electric bulb 11 cannot be seen from the side. That is, the second electric bulb 11 is completely shaded from the outside by the extending section 12 and the first reflector 5. Accordingly, the direct rays emitted by the second electric bulb 11 are shaded by the first reflector 5 and the extending section 12. Therefore, no direct rays are emergent from the second electric bulb 11 to the outside of the lighting chamber. Concerning the rays of the second electric bulb 11, only the reflected rays that are reflected by the second reflector 9 are emergent in the front direction.

In the vehicle lamp 1 described above, concerning the rays of the first electric bulb 8, both the direct rays and the reflected rays that are reflected by the first reflector 5 are emergent in the front direction, and concerning the rays of the second electric bulb 11, only the reflected rays that are reflected by the second reflector 9 are emergent in the front direction. Accordingly, when the vehicle lamp is seen in the front direction of the lamp (that is, when this vehicle lamp is seen from the rear of the vehicle), a portion of the lens 3 corresponding to the first reflector 5 shines brightly, whereas a portion of the second reflector 9 corresponding to the portion protruding from the first reflector 5 shines dimly by the effect of indirect irradiation. Therefore, a clear contrast is caused between the above two portions. Accordingly, it is possible to give an intense impression on a person who sees the vehicle lamp. Especially when a stopping operation is conducted by depressing the brake pedal, for example, the first electric bulb 8 shines more brightly. Therefore, the contrast becomes more remarkable between the portion that is illuminated by the first electric bulb 8 and the portion that is illuminated by the second electric bulb 11.

When the vehicle lamp is not turned on, the same patterns can be seen in the entire vehicle lamp, because almost all portions of the lens 3—except for the region 3a—are transparent, and because the shapes of the reflecting elements 6, 6, . . . of the first reflector 5 are similar to the shapes of the reflecting elements 10, 10, . . . of the second reflector 9. Therefore, the vehicle lamp can be visually recognized as an integrated lighting device. When the vehicle lamp is turned on, however, the aforementioned contrast is caused, and a person who sees the vehicle lamp can be given a new impression.

The light transmitting section 7 is formed in the first reflector 5, so that the rays of the second electric bulb 11 can be irradiated through the light transmitting section 7. Therefore, the rays of the second electric bulb 11 can be effectively utilized. Thus, even when the wire of the first electric bulb 8 is broken, there is no possibility that a region to be illuminated by the rays of the first electric bulb 8 becomes completely dark. Therefore, this vehicle lamp contributes to improved traffic safety. Of course, the light transmitting section 7 need not be provided.

When the light transmitting section 7 is formed according to the profile of the reflecting element 6, it is possible to avoid a case in which the light transmitting section 7 stands out excessively. Therefore, the light rays are emitted from the vehicle lamp so that the lamp still looks natural.

Since the first reflector 5 and the second reflector 9 are respectively composed of a group of small reflecting elements 6, 6, . . . and a group of small reflecting elements 10, 10, . . . , the manner in which the curved faces on these reflecting elements 6, 6, . . . and 10, 10, . . . are arranged can be arbitrarily set. Due to the foregoing, it is possible to reduce the depth of the vehicle lamp 1 while the light-emitting region is kept large. That is, it is possible to reduce the thickness of the vehicle lamp 1.

Figure 5:
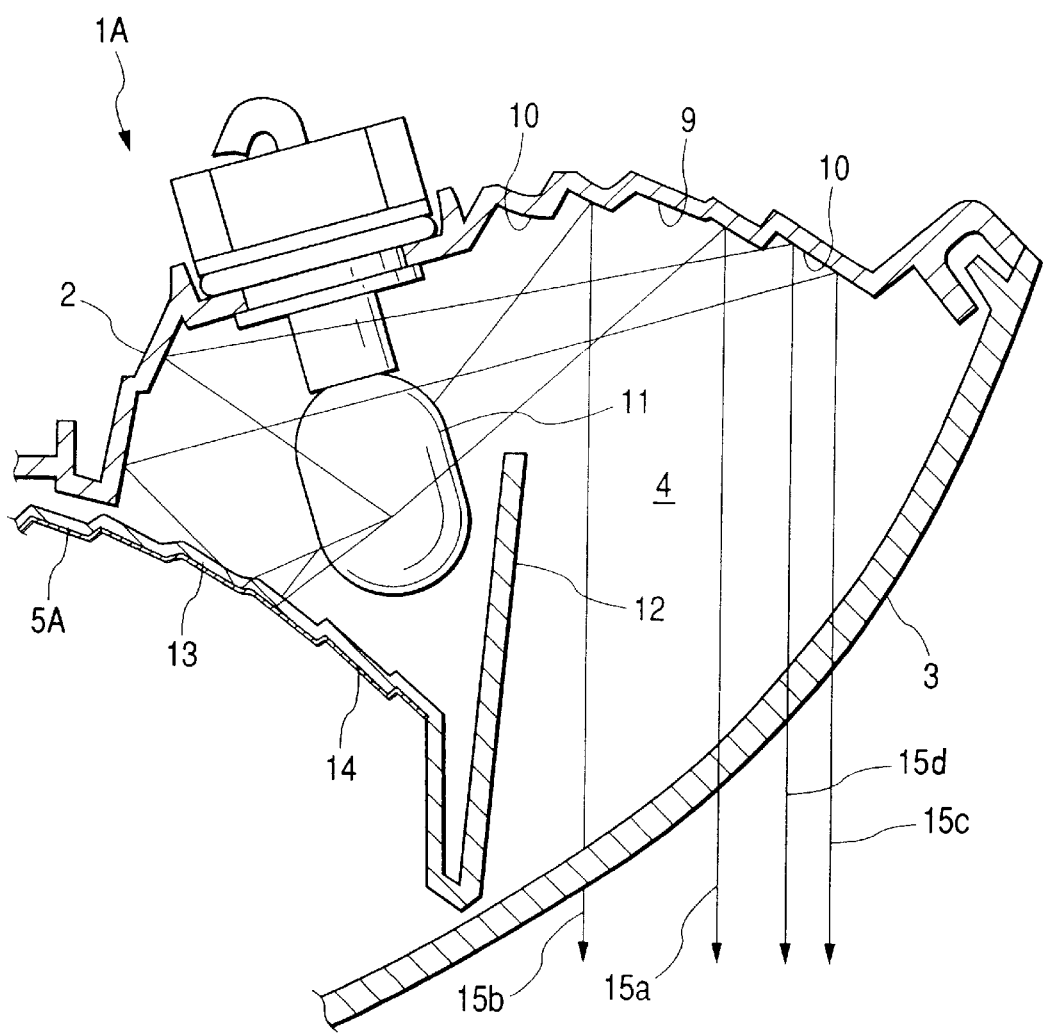
FIG. 5 is an horizontal cross-sectional view showing a primary portion of the second embodiment of the vehicle lamp of the present invention.

FIG. 5 shows a second embodiment of the vehicle lamp of the present invention.

The main structure of the vehicle lamp 1A, of the second embodiment, is the same as that of the vehicle lamp 1 of the above-described first embodiment. However, the structure of the first reflector of the second embodiment is different from that of the first embodiment. Accordingly, the action of the second embodiment is a little different from that of the first embodiment.

The base material 13 of the first reflector 5A of the vehicle lamp 1A of the second embodiment is made of transparent synthetic resin. A reflecting film 14 is then formed on a surface of the transparent base material 13 by means of vapor-deposition of aluminum.

When the first reflector 5A is composed as described above, the rays emitted from the second electric bulb 11 include: rays 15a which are reflected by the second reflector 9 and are irradiated onto the front side of the lamp; rays 15b which are reflected on the back side of the reflecting film 14 of the first reflector 5A, and are then reflected by the second reflector 9 so that they are irradiated to the front side of the lamp; rays 15c which are reflected on the back side of the reflecting film 14 of the first reflector 5A, are reflected by the second reflector 9 a plurality of times, and then are reflected to the front side of the lamp; and rays 15d which are reflected by the second reflector 9 a plurality of times, and then are irradiated to the front side of the lamp. Compared with the above-described vehicle lamp 1 of the first embodiment, the vehicle lamp of the second embodiment can effectively utilize the rays of the second electric bulb 11.

In this connection, even when the reflecting film 14 is formed on the back face of the transparent base material 13, the same effect can be provided.

Even when the base material of the first reflector is opaque (as opposed to the base material of the first reflector being transparent) and the reflecting faces are formed on both the front and the reverse side, the same effect can be provided. However, when the transparent base material 13 is used as shown in the drawing, and the reflecting film is formed only on one of the front and the back surface, it becomes possible to economize material and labor to manufacture the vehicle lamp and, therefore, the manufacturing cost is reduced.

The profile and structure of each section of each embodiment is a mere example of the embodiment of the present invention. Therefore, it should be noted that the technical scope of the present invention is not limited by the specific example described above.

As described above, the present invention provides a vehicle lamp including:

a lighting chamber composed of a body and a lens covering an opening face of the body, wherein the opening face of the body is directed substantially in a front direction of the lamp;

a first reflector, which is arranged in the lighting chamber, for reflecting the rays of a first light source in the front direction;

a second light source arranged at the rear of the first reflector so that the second light source can not be seen from the front direction; and a second reflector for reflecting the rays of the second light source, wherein the two reflectors are positioned so that they can separately reflect the rays of the first and the second light sources without dividing the lighting chamber.

Accordingly, when both the first and the second light sources are turned on, concerning the rays of the first light source, both the direct rays of the first light source and the reflected rays of the first light source that are reflected by the reflector are irradiated to the front. On the other hand, concerning the rays of the second light source, only the reflected rays that are reflected by the second reflector are irradiated to the front of the lamp, that is, the rays of the second light source are irradiated by indirect irradiation. Therefore, a contrast is caused between the rays of the first light source and the rays of the second light source. Accordingly, it is possible to give an intense impression on a person who sees this vehicle lamp. Further, when the vehicle lamp is not turned on, the entire vehicle lamp can be visually recognized as an integrated body.

According to a second aspect of the invention, a vehicle lamp further includes an extending section extending from an edge section of the first reflector to substantially the rear, wherein the second light source is shielded from view outside the lighting chamber by the extending section and the first reflector. Therefore, all rays of the second light source become indirect rays. Accordingly, the clear contrast is caused between the rays of the first light source and the rays of the second light source.

According to a third aspect of the present invention, a vehicle lamp includes an extending section that is formed monolithically with the first reflector. Therefore, the clear contrast can be caused between the rays of the first light source and the rays of the second light source without increasing the number of parts.

According to a fourth aspect of the present invention, a vehicle lamp includes a reflecting face, of the second reflector, that is composed of small paraboloid reflecting elements which are arranged on an arbitrarily curved face so that the focuses of the small paraboloid reflecting elements coincide with the position of the second light source, and includes a portion of the reflecting face, of the second reflector, that protrudes at least from one side edge section of the first reflector when the lighting device is seen from the front direction. Therefore, the depth of the second reflector can be reduced. Accordingly, it is possible to reduce the thickness of the vehicle lamp while the light-emitting region of the rays of the second light source is extended.

According to a fifth aspect of the present invention, a vehicle lamp includes a light transmitting section that is formed in the first reflector, and the rays of the second light source are irradiated in the front direction via the light transmitting section. Therefore, the rays of the second light source can be effectively utilized. Thus, even when the first light source is out of order, there is no possibility that a region to be illuminated by the first light source becomes dark. Accordingly, the present invention contributes to improved traffic safety.

According to a sixth aspect of the present invention, a vehicle lamp in which the reflecting face of the first reflector is composed of a plurality of small reflecting elements, the light transmitting section is formed by removing one or several reflecting elements from the reflecting face of the first reflector. Therefore, the depth of the first reflector can be reduced. Accordingly, the present invention can contribute to the reduction of the thickness of the vehicle lamp. Further, it is possible to prevent the light transmitting section from excessively standing out. Therefore, appearance of the vehicle lamp is not impaired.

According to a seventh aspect of the present invention, a vehicle lamp includes a first reflector that has a reflecting face on which the rays incident on the first reflector from the back are reflected, and the rays directed from the second light source to the back face of the first reflector are reflected on the reflecting face and then are reflected by the second reflector and irradiated in the front direction of the lamp. Therefore, the rays of the second light source can be effectively utilized.

According to an eighth aspect of the present invention, a vehicle lamp includes a first reflector that has a reflecting face on which the rays incident on the first reflector from the back face are reflected, and a portion of the rays emergent from the second light source are reflected on the back face of the first reflector and/or the second reflector a plurality of times, and then are irradiated in the front direction of the lamp. Therefore, the rays of the second light source are more effectively utilized.

What is claimed is:

1. A vehicle lamp comprising:
   a lighting chamber composed of a body and a lens covering an opening face of the body, wherein the opening face of the body is directed substantially in a front direction of the lamp;
   a first reflector, which is arranged in the lighting chamber, for reflecting the rays of a first light source in the front direction;
   a second light source arranged at the rear of the first reflector so that the second light source can not be seen from the front direction; and
   a second reflector for reflecting the rays of the second light source, wherein the two reflectors are positioned so that they can separately reflect the rays of the first and the second light sources without dividing the lighting chamber,
   wherein the second reflector is disposed to surround at least a portion of said first reflector when viewed from the front direction.

2. A vehicle lamp according to claim 1, further comprising an extending section extending from an edge section of the first reflector substantially to the rear, wherein the second light source is shielded from view outside the lighting chamber by the extending section and the first reflector.

3. A vehicle lamp according to claim 2, wherein the extending section is formed monolithically with the first reflector.

4. A vehicle lamp according to claim 1, wherein a reflecting face of the second reflector is composed of small paraboloid reflecting elements which are arranged on an arbitrary curved face so that the focuses of the small paraboloid reflecting elements coincide with the position of the second light source, and a portion of the reflecting face of the second reflector protrudes at least from one side edge of the first reflector when the lighting device is seen from the front direction.

5. A vehicle lamp according to claim 1, wherein the first reflector has a reflecting face on which the rays incident on the first reflector from the rear are reflected, and the rays directed from the second light source to the rear of the first reflector are reflected on the reflecting face, are reflected by the second reflector, and then are irradiated in the front direction.

6. A vehicle lamp according to claim 1, wherein the first reflector has a reflecting face on which the rays incident on the first reflector from the rear are reflected, and a portion of the rays emergent from the second light source are reflected on the rear of the first reflector, are reflected by the second reflector a plurality of times, and then are irradiated in the front direction.

7. A vehicle lamp according to claim 1, wherein the first reflector has a reflecting face on which the rays incident on the first reflector from the rear are reflected, and a portion of the rays emergent from the second light source are reflected by the second reflector a plurality of times, and then are irradiated in the front direction.

8. A vehicle lamp comprising:
    a lighting chamber composed of a body and a lens covering an opening face of the body, wherein the opening face of the body is directed substantially in a front direction of the lamp;
    a first reflector, which is arranged in the lighting chamber, for reflecting the rays of a first light source in the front direction;
    a second light source arranged at the rear of the first reflector so that the second light source can not be seen from a side direction; and
    a second reflector for reflecting the rays of the second light source, wherein the two reflectors are positioned so that they can separately reflect the rays of the first and the second light sources without dividing the lighting chamber,
    wherein a light transmitting section is formed in the first reflector, and the rays of the second light source are irradiated in the front direction via the light transmitting section; and
    wherein the second reflector is disposed to surround at least a portion of said first reflector when viewed from the front direction.

9. A vehicle lamp according to claim 8, wherein the reflecting face of the first reflector is composed of a plurality of small reflecting elements, and the light transmitting section is formed by removing one or several reflecting elements from the reflecting face of the first reflector.

10. A vehicle lamp comprising:
    a lighting chamber composed of a body and a lens covering an opening face of the body, wherein the opening face of the body is directed substantially in a front direction of the lamp;
    a first reflector, which is arranged in the lighting chamber, for reflecting the rays of a first light source in the front direction;
    a second light source arranged at the rear of the first reflector so that the second light source can not be seen from the front direction; and
    a second reflector for reflecting the rays of the second light source, wherein the two reflectors are positioned so that they can separately reflect the rays of the first and the second light sources without dividing the lighting chamber;
    wherein the first reflector has a reflecting face on which the rays incident on the first reflector from the rear are reflected, and the rays directed from the second light source to the rear of the first reflector are reflected on the reflecting face, are reflected by the second reflector, and then are irradiated in the front direction.

* * * * *